United States Patent
Dirumdam et al.

(10) Patent No.: US 9,450,382 B2
(45) Date of Patent: Sep. 20, 2016

(54) SPARK PLUG FOR AN INTERNAL COMBUSTION ENGINE

(71) Applicants: Björn Dirumdam, Ellgau (DE); Ingo Wilke, Tutzing (DE)

(72) Inventors: Björn Dirumdam, Ellgau (DE); Ingo Wilke, Tutzing (DE)

(73) Assignee: MAN Diesel & Turbo SE, Augsburg (DE)

( * ) Notice: Subject to any disclaimer, the term of this patent is extended or adjusted under 35 U.S.C. 154(b) by 226 days.

(21) Appl. No.: 13/894,127

(22) Filed: May 14, 2013

(65) Prior Publication Data
US 2013/0312692 A1    Nov. 28, 2013

(30) Foreign Application Priority Data
May 15, 2012   (DE) .................. 10 2012 208 069

(51) Int. Cl.
| | |
|---|---|
| F02P 7/02 | (2006.01) |
| H01T 13/14 | (2006.01) |
| H01T 13/46 | (2006.01) |
| F02P 7/063 | (2006.01) |
| F02D 17/04 | (2006.01) |
| B60R 25/04 | (2013.01) |
| F01M 1/26 | (2006.01) |

(52) U.S. Cl.
CPC ............ H01T 13/14 (2013.01); H01T 13/467 (2013.01); B60R 25/04 (2013.01); F01M 1/26 (2013.01); F02D 17/04 (2013.01); F02P 7/021 (2013.01); F02P 7/0632 (2013.01)

(58) Field of Classification Search
CPC ........ F02P 7/0632; F02P 7/021; F01M 1/26; B60R 25/04; F02D 17/04
USPC .................................. 123/146.5 R
See application file for complete search history.

(56) References Cited

U.S. PATENT DOCUMENTS

| | | | |
|---|---|---|---|
| 4,490,122 A | 12/1984 | Tromeur | |
| 4,730,582 A | 3/1988 | Lindsay | |
| 5,051,651 A * | 9/1991 | Kashiwara | H01T 13/32 313/139 |
| 6,013,973 A * | 1/2000 | Sato | 313/143 |

FOREIGN PATENT DOCUMENTS

| | | |
|---|---|---|
| DE | 39 37 215 | 5/1990 |
| DE | 101 45 944 | 4/2003 |
| DE | 102 2008 061 242 | 6/2010 |

* cited by examiner

*Primary Examiner* — Lindsay Low
*Assistant Examiner* — Charles Brauch
(74) *Attorney, Agent, or Firm* — Cozen O'Connor

(57) ABSTRACT

Spark plug for an internal combustion engine, having a center electrode and a ground electrode arranged in radial direction around the center electrode, wherein an annular spark gap is formed between the center electrode and the ground electrode for igniting a fuel mixture by means of an electric ignition spark developing between the center electrode and the ground electrode, and wherein the ground electrode is contoured in such a way that particles reaching the region of the ground electrode can be removed from the spark gap under the influence of gravitational force.

7 Claims, 1 Drawing Sheet

SPARK PLUG FOR AN INTERNAL COMBUSTION ENGINE

BACKGROUND OF THE INVENTION

1. Field of the Invention

The invention is directed to a spark plug for an internal combustion engine and an internal combustion engine.

2. Description of the Related Art

Spark plugs are used for electric ignition of a fuel mixture to be burned in an internal combustion engine. Between a center electrode and a ground electrode of a spark plug there is a spark gap in which an electric ignition spark can be formed for igniting the fuel mixture.

A basic distinction is made between spark plugs with a hooked ground electrode and spark plugs with an annular ground electrode. DE 10 2008 061 242 A1 shows an internal combustion engine with a spark plug having a hooked ground electrode, the spark gap extending axially between one end of the center electrode and one end of the hooked ground electrode viewed in axial direction of the center electrode. A spark plug with an annular ground electrode is known from DE 101 45 944 A1. In this case, the spark gap extends between the center electrode and the ground electrode in radial direction around the center electrode.

SUMMARY OF THE INVENTION

The present invention is directed to an ignition electrode with an annular spark gap that extends around the center electrode between the center electrode and the ground electrode arranged around the center electrode in radial direction, in which spark gap an electric ignition spark can form for igniting the fuel.

Although fuel mixture to be burned in an internal combustion engine is filtered before being introduced into the combustion chamber, there is always the possibility that contaminating particles will reach the combustion chamber, particularly in the region of the spark plug, and settle in the spark gap between the center electrode and the ground electrode.

When particles settle in the spark gap between the center electrode and the ground electrode, a short circuit results between the electrodes so that an ignition spark can no longer form. In this case, the fuel mixture can no longer be ignited.

It is an object of one embodiment of the invention to provide a novel spark plug for an internal combustion engine and an internal combustion engine with a spark plug of this kind.

According to one embodiment of the invention, the ground electrode is contoured such that particles reaching the region of the ground electrode can be removed from the spark gap under the influence of gravitational force. The present invention proposes a spark plug whose ground electrode arranged in radial direction around the center electrode is contoured such that particles reaching the region of the ground electrode can be removed from the spark gap under the influence of gravitational force. In this way, particles reaching the region of the ground electrode are prevented from settling in the spark gap so that a short circuit is prevented and a reliable ignition of the fuel mixture can be ensured.

The ground electrode preferably has a portion extending in axial direction of the center electrode and a portion extending in radial direction of the center electrode, wherein the spark gap is formed between the center electrode and the portion of the ground electrode extending in radial direction, and wherein the ground electrode is so contoured at an upper surface of the portion extending in radial direction of the center electrode that the surface extends downward in the manner of a ramp with increasing distance from the spark gap. This contouring of the ground electrode is particularly simple and makes it possible to prevent particles from settling in the spark gap in a reliable manner.

According to one embodiment of the invention, a valley is formed at an upper surface of the portion extending in radial direction of the center electrode. This valley is preferably formed adjacent to through-holes for the fuel mixture which penetrate the ground electrode, namely, viewed in radial direction of the center electrode, between the through-holes and the spark gap at a relatively short radial distance from the through-holes and at a relatively large radial distance from the spark gap. This embodiment of the ground electrode is particularly preferred to keep particles away from the spark gap under the influence of gravitational force.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings.

Preferred further developments of the invention are indicated in the subclaims and the following description. Embodiment examples of the invention are described more fully with reference to the drawings without the invention being limited to these embodiments. The drawings show:

DETAILED DESCRIPTION OF THE PRESENTLY PREFERRED EMBODIMENTS

Figure 1:
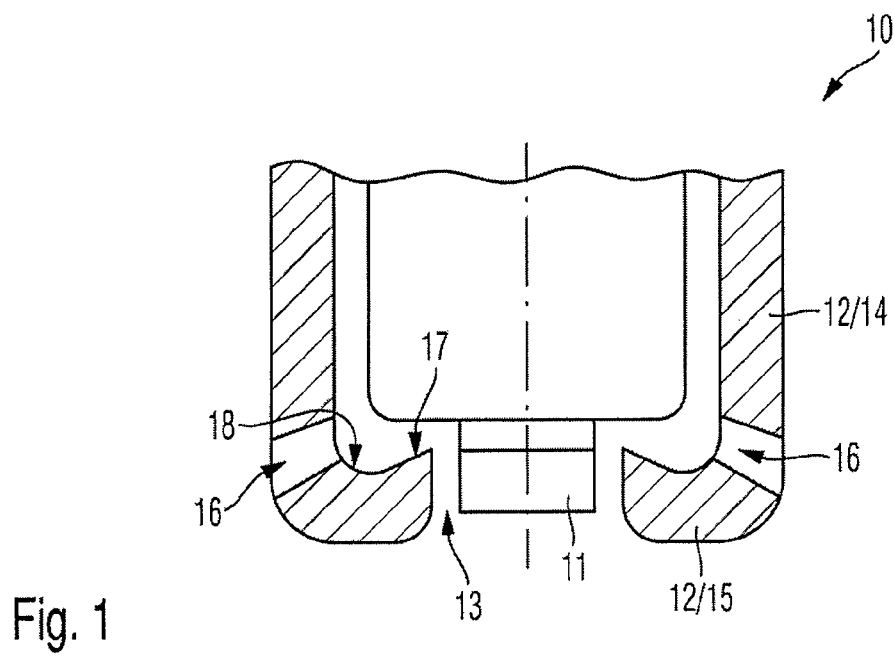
FIG. 1 is a schematic diagram showing a spark plug according to the invention.
Figure 2:
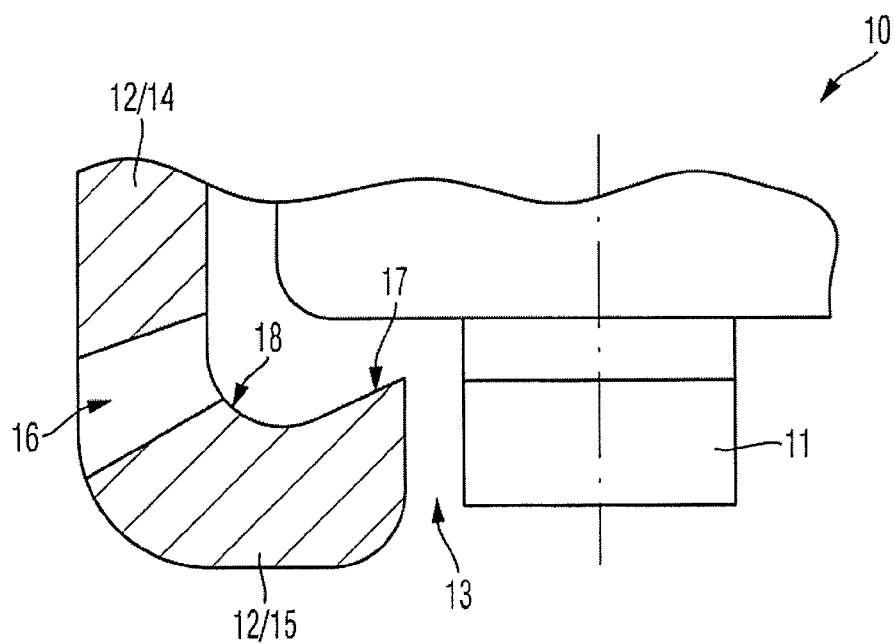
FIG. 2 is a detail of the spark plug according to FIG. 1.

FIGS. 1 and 2 schematically show a detail of a preferred embodiment example of a spark plug 10 in which the spark plug 10 has a center electrode 11 and a ground electrode 12 arranged in radial direction around the center electrode 11. The ground electrode 12 is preferably contoured annularly and is constructed as a ring electrode.

Between the center electrode 11 and the ground electrode 12, an annular spark gap 13 is formed in which an electric ignition spark can form for igniting a fuel mixture between the center electrode 11 and the ground electrode 12.

As is shown in FIGS. 1 and 2, the ground electrode 12 has a first portion 14 extending in axial direction of the center electrode 11 and a second portion 15 extending in radial direction of the center electrode 11, the annular spark gap 13 being formed between the center electrode 11 and a free end of the second portion 15 of the ground electrode 12 extending in radial direction.

Through-holes 16 for the fuel mixture to be ignited are incorporated in the ground electrode 12 in order to guide the fuel mixture into the region of the spark gap 13.

To prevent contaminating particles that may be present in the fuel mixture in spite of filtration from settling in the region of the spark gap 13, the ground electrode 12 is contoured in such a way that particles reaching the region of the ground electrode 12 or the region of the spark gap 13 can be removed or guided away from the spark gap 13 under the influence of gravitational force.

To this end, the ground electrode 12 in the embodiment example shown in the drawings, is so contoured at an upper surface 17 of the portion 15 extending in radial direction of the center electrode 11 that the upper surface 17 extends downward in the manner of a ramp with increasing distance from the spark gap 13, namely so as to form a valley 18 which extends annularly around the spark gap 13 at a radial distance.

The valley 18 is formed in a transition area between the first portion 14 of the ground electrode extending in axial direction of the center electrode 11 and the second portion 15 of the ground electrode 12 extending in radial direction of the center electrode 11, namely adjacent to the through-holes 16, wherein, viewed in radial direction of the center electrode 11, the valley 18 is positioned between the through-holes 16 and the spark gap 13, namely at a relatively large radial distance from the spark gap 13 and at a relatively short radial distance from the through-holes 16.

Particles reaching the region of the ground electrode 12 of the spark plug 10 can be successfully removed from the spark gap 13 using the influence of gravitational force so that the particles cannot settle in the region of the spark gap 13. In this way, a short circuit between the center electrode 11 and the ground electrode 12 can be prevented and a reliable ignition of the fuel mixture can be ensured.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A spark plug for an internal combustion engine, comprising
    a center electrode;
    a ground electrode arranged in radial direction around the center electrode; and
    an annular spark gap is formed between the center electrode and the ground electrode for igniting a fuel mixture by an electric ignition spark between the center electrode and the ground electrode,
    wherein the ground electrode is contoured such that particles reaching a region of the ground electrode can be removed from the annular spark gap under an influence of gravitational force,
    wherein the ground electrode has a first portion extending in axial direction of the center electrode and a second portion extending in radial direction toward the center electrode,
    through-holes for the fuel mixture arranged circumferentially in the first portion that penetrate the ground electrode viewed in radial direction of the center electrode, whereby the particles reaching the region of the ground electrode are removed via the through-holes,
    wherein the annular spark gap is formed between the center electrode and the second portion of the ground electrode, and
    wherein the ground electrode is contoured at an upper surface of the second portion extending in radial direction of the center electrode such that the upper surface extends downward in a ramp-like manner with an increasing distance from the annular spark gap, and
    wherein a valley is formed at an upper surface of the second portion extending in radial direction of the center electrode,
    wherein a lower surface of the second portion opposite the upper portion is substantially planar and substantially perpendicular to the first portion,
    wherein the valley is formed adjacent to the through-holes for the fuel mixture that penetrate the ground electrode viewed in radial direction of the center electrode, between the through-holes and the annular spark gap at a radial distance from the through-holes and at radial distance from the annular spark gap, and
    wherein the radial distance from the through-holes is smaller than the radial distance from the annular spark gap.

2. The spark plug according to claim 1, wherein the valley extends annularly around the annular spark gap at a radial distance.

3. The spark plug according to claim 2, wherein the valley is formed in a transition area between the first portion of the ground electrode and the second portion of the ground electrode.

4. An internal combustion engine, configured to burn a fuel mixture comprising gaseous fuel and air, having at least one spark plug comprising
    a center electrode; and
    a ground electrode arranged in radial direction around the center electrode,
    wherein an annular spark gap is formed between the center electrode and the ground electrode for igniting the fuel mixture by an electric ignition spark developing between the center electrode and the ground electrode, and
    wherein the ground electrode is contoured such that particles reaching a region of the ground electrode can be removed from the annular spark gap under an influence of gravitational force,
    wherein the ground electrode has a first portion extending in axial direction of the center electrode and a second portion extending in radial direction toward the center electrode,
    through-holes for the fuel mixture arranged circumferentially in the first portion that penetrate the ground electrode viewed in radial direction of the center electrode, whereby the particles reaching the region of the ground electrode are removed via the through-holes,
    wherein the annular spark gap is formed between the center electrode and the second portion of the ground electrode, and wherein the ground electrode is contoured at an upper surface of the second portion extending in radial direction of the center electrode such that the upper surface extends downward in a ramp-like manner with an increasing distance from the annular spark gap, and wherein a valley is formed at an upper surface of the second portion extending in radial direction of the center electrode, wherein a lower surface of the second portion opposite the upper portion is substantially planar and substantially perpendicular to the first portion, wherein the valley is formed adjacent to the through-holes for the fuel mixture that penetrate the ground electrode viewed in radial direction of the center electrode, between the through-holes and the annular spark gap at a radial distance from the through-holes and at radial distance from the annular spark gap, and wherein the radial distance from the through-holes is smaller than the radial distance from the annular spark gap.

5. The spark plug according to claim 1, wherein a valley is formed at an upper surface of the second portion extending in radial direction of the center electrode.

6. The spark plug according to claim 5, wherein the valley is formed in a transition area between the first portion of the ground electrode and the second portion of the ground electrode.

7. The internal combustion engine according to claim 4, wherein the internal combustion engine is an Otto gas engine.

* * * * *